United States Patent [19]

Herrington

[11] Patent Number: 4,561,109
[45] Date of Patent: Dec. 24, 1985

[54] PLASTIC BAGS WITH RELEASABLE CLOSURE WHICH RESISTS OPENING FROM INSIDE

[75] Inventor: Fox J. Herrington, Holcomb, N.Y.

[73] Assignee: Mobil Oil Corporation, New York, N.Y.

[21] Appl. No.: 623,623

[22] Filed: Jun. 22, 1984

Related U.S. Application Data

[63] Continuation of Ser. No. 433,588, Oct. 12, 1982, abandoned.

[51] Int. Cl.$^4$ .................. B65D 33/24; B29C 24/00
[52] U.S. Cl. .................................. 383/65; 383/63; 24/576; 24/587; 156/66; 264/177 R
[58] Field of Search ............... 383/63, 65, 64; 24/576, 24/587; 156/66, 465; 264/177 R

[56] References Cited

U.S. PATENT DOCUMENTS

| | | | |
|---|---|---|---|
| Re. 28,969 | 9/1976 | Naito | 150/3 |
| 2,978,769 | 4/1961 | Harrah | 383/65 X |
| 3,311,144 | 3/1967 | Lindley | 206/620 |
| 3,325,084 | 6/1967 | Ausnit | 383/63 X |
| 3,338,284 | 8/1967 | Ausnit | 383/65 |
| 3,338,285 | 8/1967 | Jaster | 150/3 |
| 3,347,298 | 10/1967 | Ausnit et al. | 383/65 |
| 3,389,783 | 6/1968 | Bjorkengren | 383/100 X |
| 3,410,327 | 11/1968 | Ausnit | 383/65 |
| 3,416,585 | 12/1968 | Staller | 150/3 |
| 3,495,306 | 2/1970 | Eichberg | 24/201 |
| 3,532,571 | 10/1970 | Ausnit | 383/65 X |
| 3,633,642 | 1/1972 | Siegel | 150/3 |
| 3,654,049 | 4/1972 | Ausnit | 383/63 X |
| 3,685,562 | 8/1972 | Ausnit | 206/602 |
| 3,780,781 | 12/1973 | Uramoto | 206/620 |
| 3,945,403 | 3/1976 | Noguchi | 383/63 X |
| 3,948,705 | 4/1976 | Ausnit | 383/63 X |
| 4,024,010 | 5/1977 | Boccia | 156/290 |
| 4,191,230 | 3/1980 | Ausnit | 150/3 |
| 4,212,337 | 7/1980 | Kamp | 150/3 |
| 4,279,677 | 7/1981 | Takahashi | 150/3 X |
| 4,295,919 | 10/1981 | Surtina et al. | 150/3 X |
| 4,354,541 | 10/1982 | Tilman | 383/63 |
| 4,392,897 | 7/1983 | Herrington | 156/66 |

FOREIGN PATENT DOCUMENTS

| | | | |
|---|---|---|---|
| 2332191 | 6/1977 | France | 383/63 |
| 97451 | 2/1961 | Norway | 383/63 |
| 2037704 | 7/1980 | United Kingdom | 150/3 |

Primary Examiner—William Price
Assistant Examiner—Sue A. Weaver
Attorney, Agent, or Firm—Alexander J. McKillop; Michael G. Gilman; Charles J. Speciale

[57] ABSTRACT

A flexible bag has a releasable closure with a fin extending away from one of the mating pluralities of hook-like protrusions. The fin is joined to the base of the hook-like protrusions to apply disengaging force for opening the closure from the outside of the bag. The closure resists opening force from inside the bag. The protrusions have hook-like ends which have the same shape on all protrusions, which extend in one direction on one of the plurality of protrusions and in the other direction on the other plurality of protrusions. The protrusions are easily extruded from molten thermoplastic and applied to a moving web of film during an in-line bag manufacturing process.

8 Claims, 9 Drawing Figures

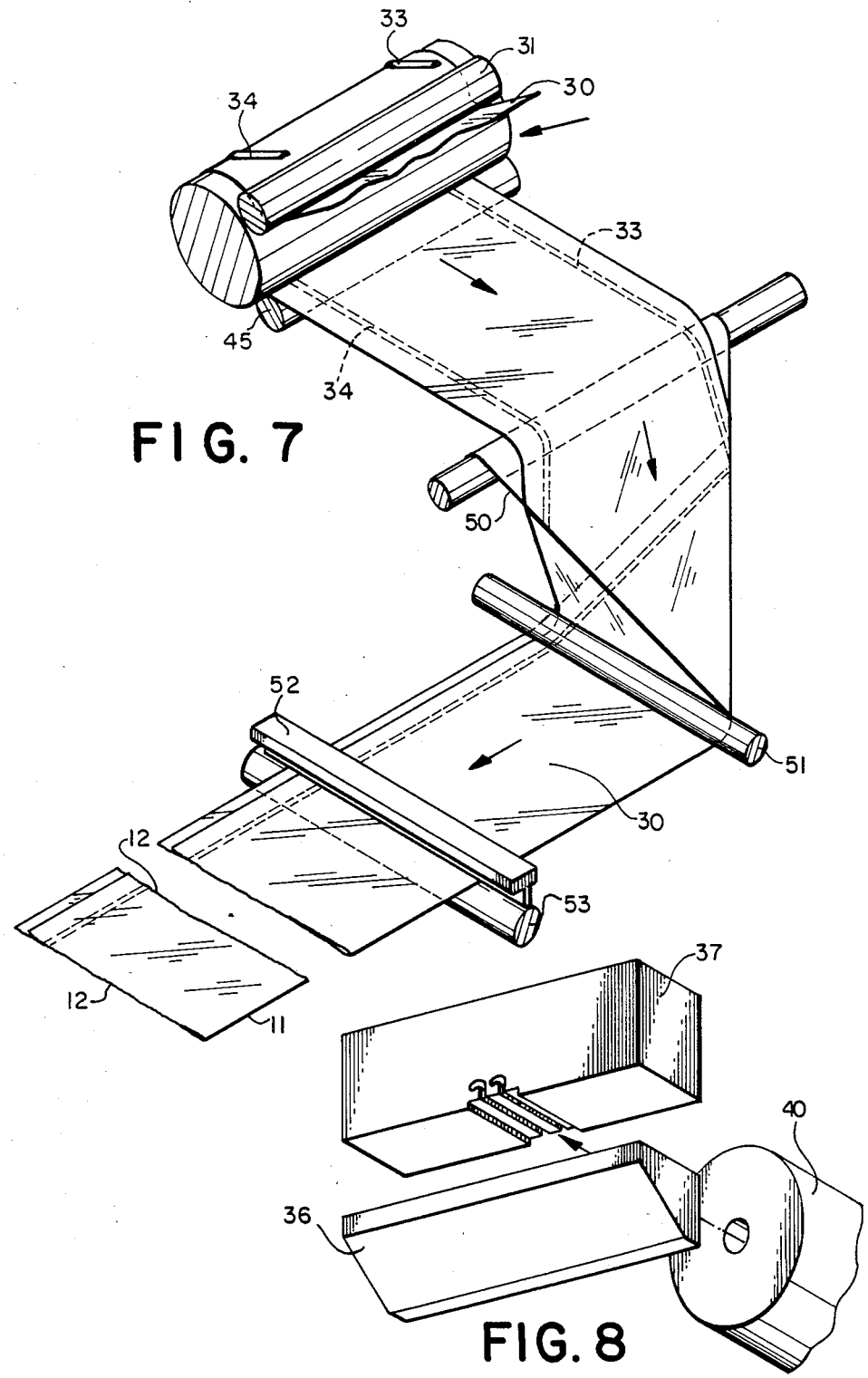

PLASTIC BAGS WITH RELEASABLE CLOSURE WHICH RESISTS OPENING FROM INSIDE

This is a continuation of copending application Ser. No. 433,588, filed on Oct. 12, 1982, abandoned.

BACKGROUND OF THE INVENTION

1. Field of the Invention

This invention relates to plastic bags having releasable closures, and more particularly, to an improvement which makes the bags resistant to accidental opening of the closure.

2. Cross-Reference to Related Application

Application Ser. No. 433,614, filed Oct. 12, 1982 (now U.S. Pat. No. 4,419,159) "Manufacture of Plastic Bags With Interlocking Profile Extrusions", Herrington, filed concurrently herewith, discloses and claims the manufacturing process which can be used in the manufacture of the bag of this invention.

3. Description of the Prior Art

Various closure arrangements have been employed for closing plastic bags. U.S. Pat. No. Re. 28,969-Naito shows the Zip-loc storage bag in which a profile extrusion on one side of the bag mates with a profile extrusion on the other side of the bag to form an interlocking, reclosable, closure.

U.S. Pat. No. 4,212,337-Kamp shows another example of a closure for a plastic bag in which the closure is formed by extruded protrusions on opposing bag surfaces which interlock to form a releasable, reclosable, closure. This patent recognizes the problem of making a closure which is easily releasable when force is applied externally to the bag, but which resists opening when force is applied to the closure by the contents of the bag. The patent suggests a solution in which the closure has a "negative angle of engagement" inside of the container and a "positive angle of engagement" on the outside of the bag. The extrusion of profiles having different engagement angles is difficult, it being much easier to extrude symmetrical, uniform profiles. The closure of the Kamp patent is attached to the heat-sealable film in a separate step after the manufacture of the film. Heat is transferred through the film to produce melting at the interface of the film and the closure to attach the closure to the film. This type of attachment is a slow process which cannot practically be performed in-line with the extrusion and bagmaking.

It is an object of the present invention to provide a closure for a plastic bag which resists opening by the contents from inside the bag, but is easily opened by hand from the outside.

It is another object of the present invention to provide a plastic bag with extruded locking profiles which are heat sealed to the plastic film during an in-line bag manufacturing process.

SUMMARY OF THE INVENTION

In accordance with the present invention, a closure for a plastic bag includes first and second pluralities of hook-like protrusions extending from opposing surfaces of a plastic bag and forming a closure for the bag when the protrusions are engaged. A fin extends away from one of the hook-like protrusions along the bag surface toward the outside of the bag. This fin is joined to the base of one of the outside hook-like protrusions. It acts as a lever to apply disengaging force to open the closure from the outside of the bag. Because the fin makes it easier to open the closure from the outside, the hook-like protrusions can be extruded in a manner such that they tightly engage one another and form a closure which resists opening by the force of the contents from the inside of the bag.

In accordance with another aspect of the invention, the hook-like protrusions are uniform and are all facing in the same direction. The protrusions are easily extruded and attached to the bag in an in-line manufacturing process.

In accordance with another aspect of the invention, multiple rows of protrusions are provided. This makes a more secure and leak-proof closure which is easier to close than prior art bags in which a single protrusion must be carefully mated to the opposing element in order to execute a closure.

The foregoing and other objects, features and advantages of the invention will be better understood from the following more detailed description and appended claims.

SHORT DESCRIPTION OF THE DRAWINGS

FIG. 7 is a perspective view of the bag forming apparatus in accordance with the present invention;

FIG. 8 shows the extrusion die in more detail; and

DESCRIPTION OF THE PREFERRED EMBODIMENT

Referring to FIGS. 1–4 a plastic bag 10 is formed from a thin, plastic film which is folded at the bottom 11 and is heat sealed along the sides 12 to form a pouch. Locking profiles 13 and 14 along the inside of the top of the bag form a reclosable closure. Each of the locking profiles includes locking protrusions such as 15, 16 and 17, 18. These hook shaped protrusions mate to lock the closure when they are pressed together. The protrusions are flexible so that the locking closure can be easily separated and then reclosed.

Figure 9:
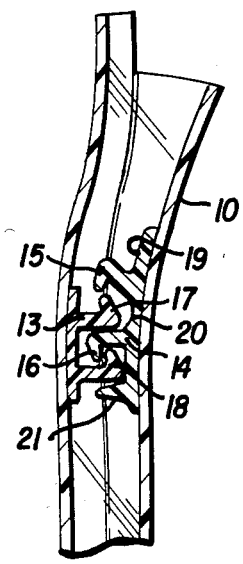
FIG. 9 is a section similar to that of FIG. 4, but more clearly showing a weakened area.

In accordance with the present invention, the closure includes a fin 19 which extends toward the outside of the bag on the side extending away from the hook on the locking protrusion 15. When the layers of film are pulled apart from outside the bag, the fin 19 provides leverage which bends the hook outwardly, releasing it from the adjacent hook on protrusion 17. The profile 14 has a "weak point" at 20, exemplified in greater detail in FIG. 9, which allows deflection so that the locking protrusion 15 can move outwardly. This leverage does not exist when force is exerted to pull the film apart from inside the bag.

The optional horizontal (FIGS. 2, 4) extension 21 at the bottom end of the profile 14 holds the locking protrusion 18 so that it cannot release under force from inside the bag. In this manner, the bag tenaciously resists opening by the contents from inside the bag but it opens easily by hand from the outside.

The protrusions 15 and 16 extend from a common base and the protrusions 17 and 18 extend from a common base. The protrusions are uniform with the hooks on protrusions 15 and 16 extending in one direction and the hooks on protrusions 17 and 18 extending in the other direction. These profiles are easily extruded and applied to the plastic film forming the bag in an in-line manufacturing process.

Figure 1:
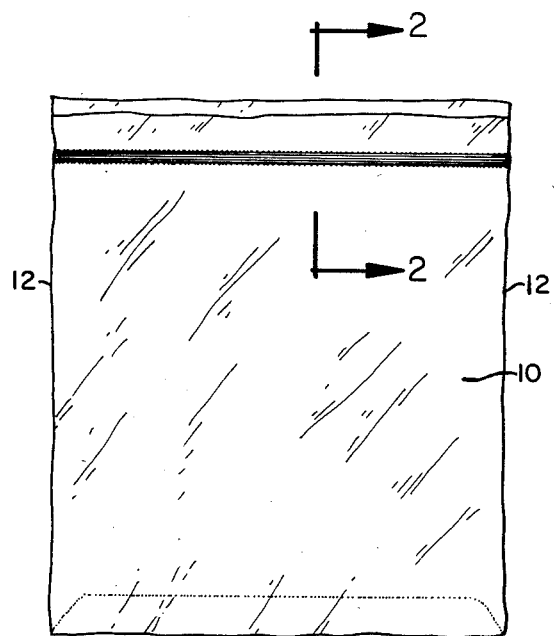
FIG. 1 shows a plastic bag having a locking profile made in accordance with the present invention.
Figure 2:
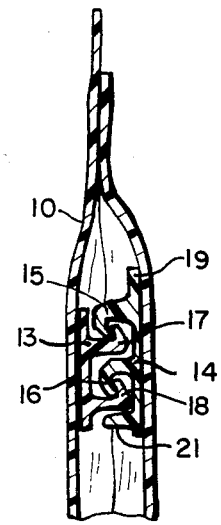
FIG. 2 is a section on the lines 2—2 of FIG. 1 showing the locking profile in more detail.
Figure 3:
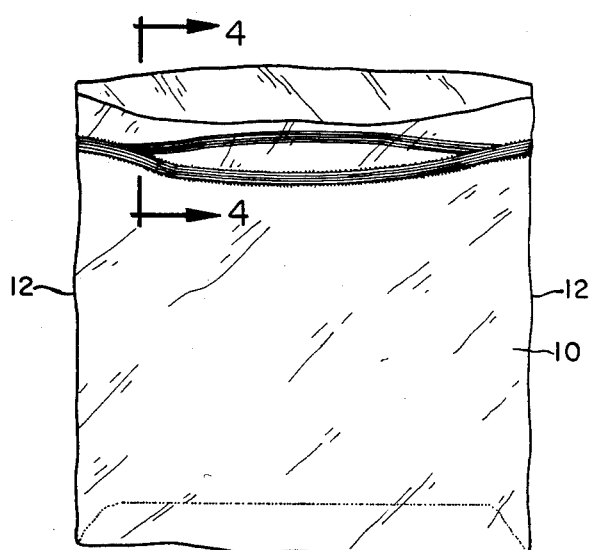
FIG. 3 shows the plastic bag with the closure partially open.
Figure 4:
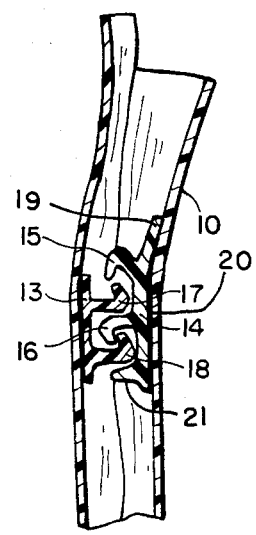
FIG. 4 is a section on the line 4—4 of FIG. 3.
Figure 5:
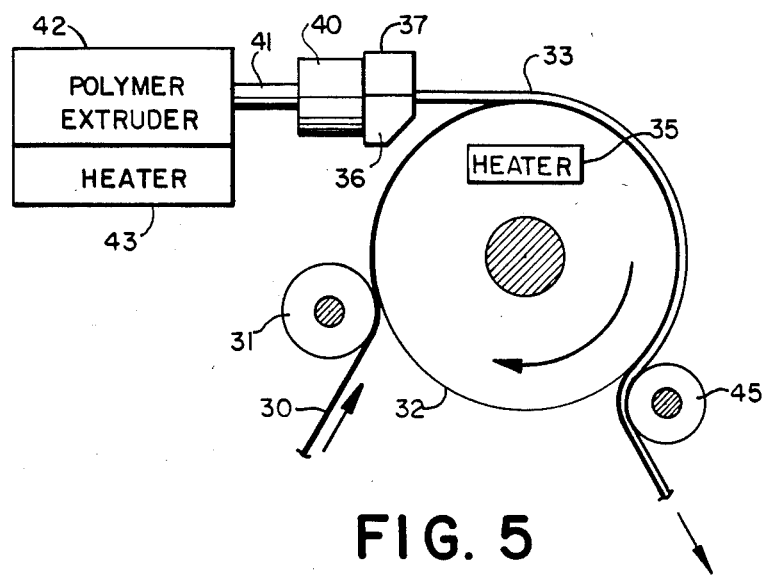
FIG. 5 is a diagrammatic drawing of the apparatus of the present invention.
Figure 6:
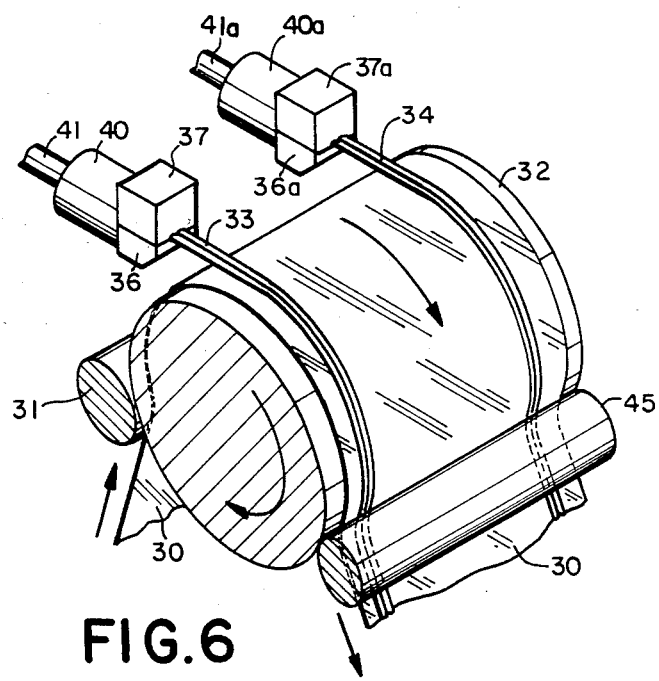
FIG. 6 shows the extruding assembly.

Apparatus claimed in my concurrently filed application can be used for making these bags. FIGS. 5–7 depict a continuous web of a thermoplastic film 30, e.g., polyethylene, moving between first nip roll 31 and a backup roller 32. As film 30 passes over back up roller 32 it is contacted by profile extrusions 33 and 34 (FIG. 6). The film passes between back up roller 32 and a second nip roller 45 and on to further processing, including heat sealing of the bag sides.

Two extruding assemblies are positioned adjacent to backup roller 32 and moving web 30 to apply the profile extrusions 33 and 34 to the moving web 30 on the side of the film opposite first or backup roller 32. Each extruding assembly comprises a feed block 40, 40a and profile extrusion die blocks 36 and 37, and 36a and 37a. Die blocks 36 and 37 are connected to the feed block 40 which is fed through pipe 41 by a source of molten thermoplastic, shown in FIG. 5 as a polymer extruder 42 with a heater 43. A heater 35 (FIG. 5) is used to maintain backup roller 32 at a desired temperature. This maintains the temperature of the moving web of film warm enough that the interface with the extrusion is at a temperature at which the materials fuse together. To make the profile adhere to the film, it is necessary to have a sufficiently high temperature where they join together. The temperature must be cool enough that the film will not distort. This is achieved by the proper combination of molten thermoplastic temperature and backup roller temperature. The backup roller must be sufficiently cool to prevent distortion of the film where it contacts the hot channel. It has been found that when the backup roller 32 is maintained at a warmer temperature, the required molten thermoplastic temperature is lower. A satisfactory operation has been achieved with a molten polyethylene temperature of 300° F. and a backup roller temperature of 140° F. at a film speed of 32 ft. per minute for 1.3 mil film. Both the film and the extrusion comprised low density polyethylene.

In order to maintain the moving web of film 30 under tension when the strip is being applied, first nip roller 31 and second nip roller 45 press the film 30 against the backup roller 32. The backup roller 32 is adjusted at a preselected tension to remove any ripples that may occur in the film 30. It is necessary to tension the film at the point where the profile joins it in order to avoid distortion or puckers. If the film tension is low, then in the final product the film is puckered along the channel. This is caused by shrinking of the profile as it cools. Applying tension to the film stretches it elastically, so that when it is released it contracts. If the amount of tension is proper, the contraction will be the same as the shrinking of the profile and the product will be smooth. If there is too much tension, then the film will try to contract more than the channel shrinks, and the channel will be rippled in large bends.

FIG. 7 shows the apparatus of the present invention in an in-line manufacturing process for making plastic bags. After leaving the extruding assembly, the film 30, having the extruded profiles 33 and 34 attached thereto, passes over triangular board 50 which is part of a center folder. After passing the roller 51, the film is folded with the profiles 33 and 34 on the mating, inside surfaces of the film. The film must be guided carefully so that the profiles will mate exactly when they join.

A heated foot squeezes the zipper in a localized area to close it. Hot seal bar 52 presses the film against back up roll 53 to seal the sides of the bag and detach the bags. One bag has been shown detached at the end of the roll in FIG. 7, the bottom 11 and sides 12 being indicated.

FIG. 8 shows an extruding assembly including a feed block 40 and a shaping portion including upper die block 37 and lower die block 36. Resin flows through the opening in feed block 40 and is extruded through the profile shape in the upper die block 37. This profile shape is cut into upper die block 37. One expedient way to cut this shape is by wire EDM (electric discharge machining). Like a jigsaw, the wire moves along its axis slowly. The block moves in a programmed path to cut the desired shape.

While a particular embodiment of the invention has been shown and described, various modifications are within the true spirit and scope of the invention. The appended claims are, therefore, intended to cover all such modifications.

What is claimed is:

1. A flexible bag, comprising:
   first and second sheets joined at the bottom and sides thereof, and releasably joined near the top thereof to form a closable bag opening;
   releasably closing means extending from near the tops of said first and second sheets and across said bag opening, comprising:
   first releasing means extending from said first sheet toward said second sheet and comprising first and second downwardly-opening, hook-like locking protrusions integrally connected to a first common base attached to said first sheet;
   second releasing means extending from said second sheet toward said first sheet and comprising third and fourth upwardly-opening, hook-like locking protrusions integrally connected to a second common base attached to said second sheet for releasably engaging with said first and second hook-like locking protrusions respectively;
   said first and second releasing means being positioned so that said third protrusion extends between said first and second protrusions and said second protrusion extends between said third and fourth protrusions;
   said first releasing means further comprising a fin extending towards the top of said first sheet from said first common base and being integrally connected with said first common base and attached to said first sheet, said fin causing the first protrusion of said first releasing means to pivot away from engaging with the third protrusion of said second releasing means to facilitate opening of the bag from outside thereof, said second releasing means having no portion thereof which overlies said first protrusion and which is contactable by said first protrusion as it pivots away from said third protrusion, and a weak point in said first common base located between said first and second protrusions defining a pivot point to further facilitate pivoting of said first protrusion away from said third protrusion upon the application of disengaging force from the outside of the bag.

2. A flexible bag, comprising:

first and second sheets joined at the bottom and sides thereof, and releasably joined near the top thereof to form a closable bag opening;

releasably closing means extending from near the tops of said first and second sheets and across said bag opening, comprising:

first releasing means extending from said first sheet toward said second sheet and comprising first and second downwardly-opening, hook-like locking protrusions integrally connected to a first common base attached to said first sheet;

second releasing means extending from said second sheet toward said first sheet and comprising third and fourth upwardly-opening, hook-like locking protrusions integrally connected to a second common base attached to a second sheet for releasably engaging with said first and second hook-like locking protrusions respectively;

said first and second releasing means being positioned so that said third protrusion extends between said first and second protrusions and said second protrusion extends between said third and fourth protrusions;

said first releasing means further comprising a fin extending towards the top of said first sheet from said first common base and being integrally connected with said first common base and attached to said first sheet, said fin causing the first protrusion of said first releasing means to pivot away from engaging with the third protrusion of said second releasing means to facilitate opening of the bag from outside thereof, said second releasing means having no portion thereof which overlies said first protrusion and which is contactable by said first protrusion of said first releasing means as it pivots away from said third protrusion and a weak point in said first common base located between said first and second protrusions defining a pivot point to further facilitate pivoting of said first protrusion away from said third protrusion upon the application of disengaging force from the outside of the bag; and a horizontal extension at the bottom of said first releasing means integral with said first common base, and extending inwardly from said first common base to underlie said fourth protrusion and inhibit its being released by force from inside said bag.

3. A flexible bag, comprising:

first and second sheets joined at the bottom and sides thereof, and releasably joined near the top thereof to form a closable bag opening;

releasably closing means extending from near the tops of said first and second sheets and across said bag opening, comprising:

first releasing means extending from said first sheet toward said second sheet and comprising first and second downwardly-opening, hook-like locking protrusions integrally connected to a first common base attached to said first sheet;

second releasing means extending from said second sheet toward said first sheet and comprising third and fourth upwardly-opening, hook-like locking protrusions integrally connected to a second common base attached to said second sheet for releasably engaging with said first and second hook-like locking protrusions respectively;

said first and second releasing means being positioned so that said third protrusion extends between said first and second protrusions and said second protrusion extends between said third and fourth protrusions;

said first releasing means further comprising a fin extending towards the top of said first sheet from said first common base and being integrally connected with said first common base and attached to said first sheet, said fin causing the first protrusion of said first releasing means to pivot away from engaging with the third protrusion of said second releasing means to facilitate opening of the bag from outside thereof, said second releasing means having no portion thereof which overlies said first protrusion and which is contactable by said first protrusion as it pivots away from said third protrusion.

4. A flexible bag as claimed in claim 3, wherein the fin of said first releasing means extends upwardly of said bag beyond the extent of the second common base of said second releasing means.

5. A flexible bag as in claim 1, wherein the fin of said first releasing means extends upwardly of said bag beyond the extent of the second common base of said second releasing means.

6. A flexible bag as in claim 2, wherein the fin of said first releasing means extends upwardly of said bag beyond the extent of the second common base of said second releasing means.

7. The flexible bag recited in claim 3 wherein said common bases and respective plurality of hook-like locking protrusions are extruded from molten thermoplastic and applied to a moving web of film so that said thermoplastic adheres to said moving web upon contact and thereafter cools to set said thermoplastic.

8. The flexible bag recited in claim 3, wherein said fin terminates below an upper open end of said bag.

* * * * *